United States Patent Office 3,389,247
Patented June 18, 1968

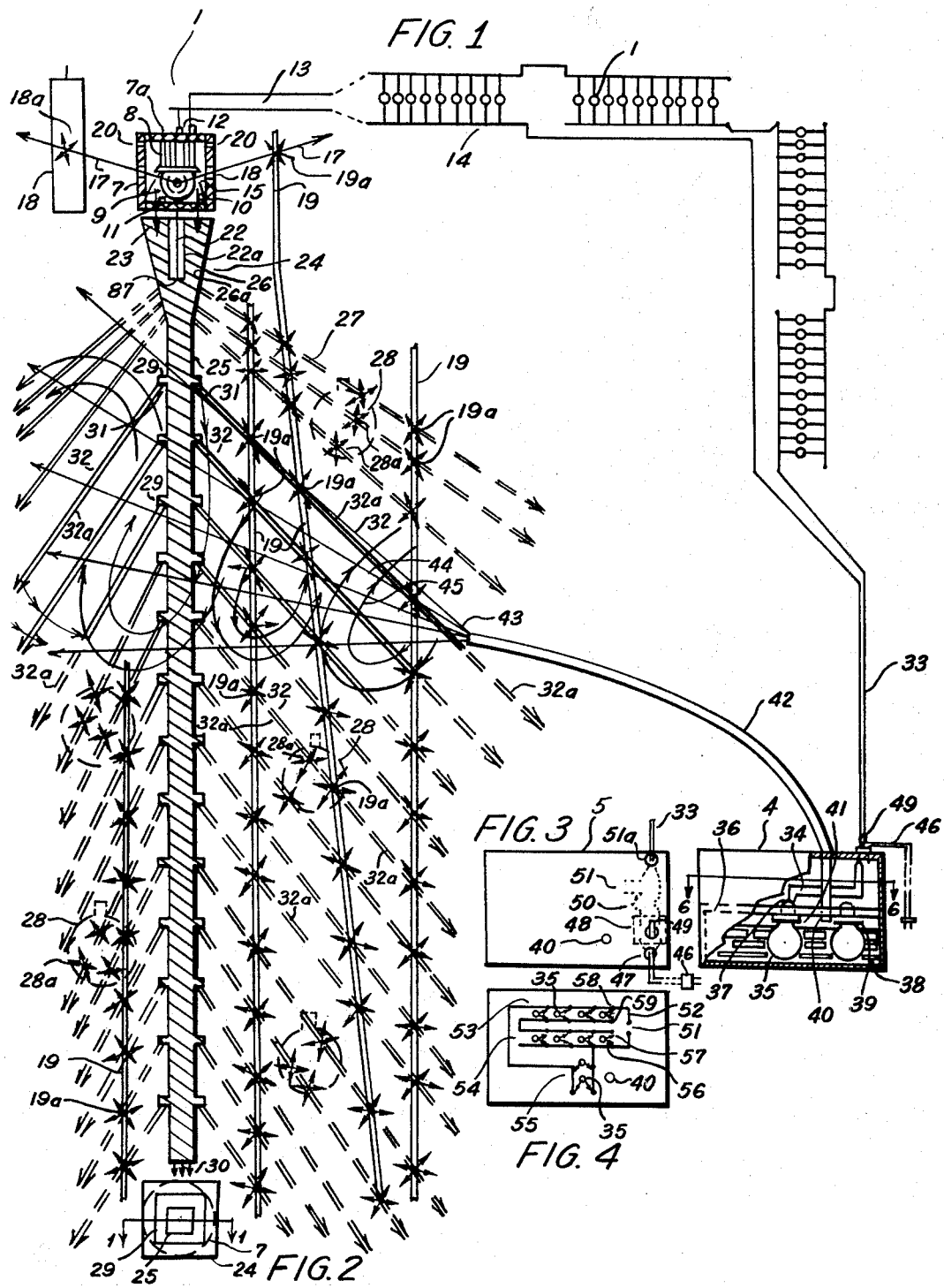

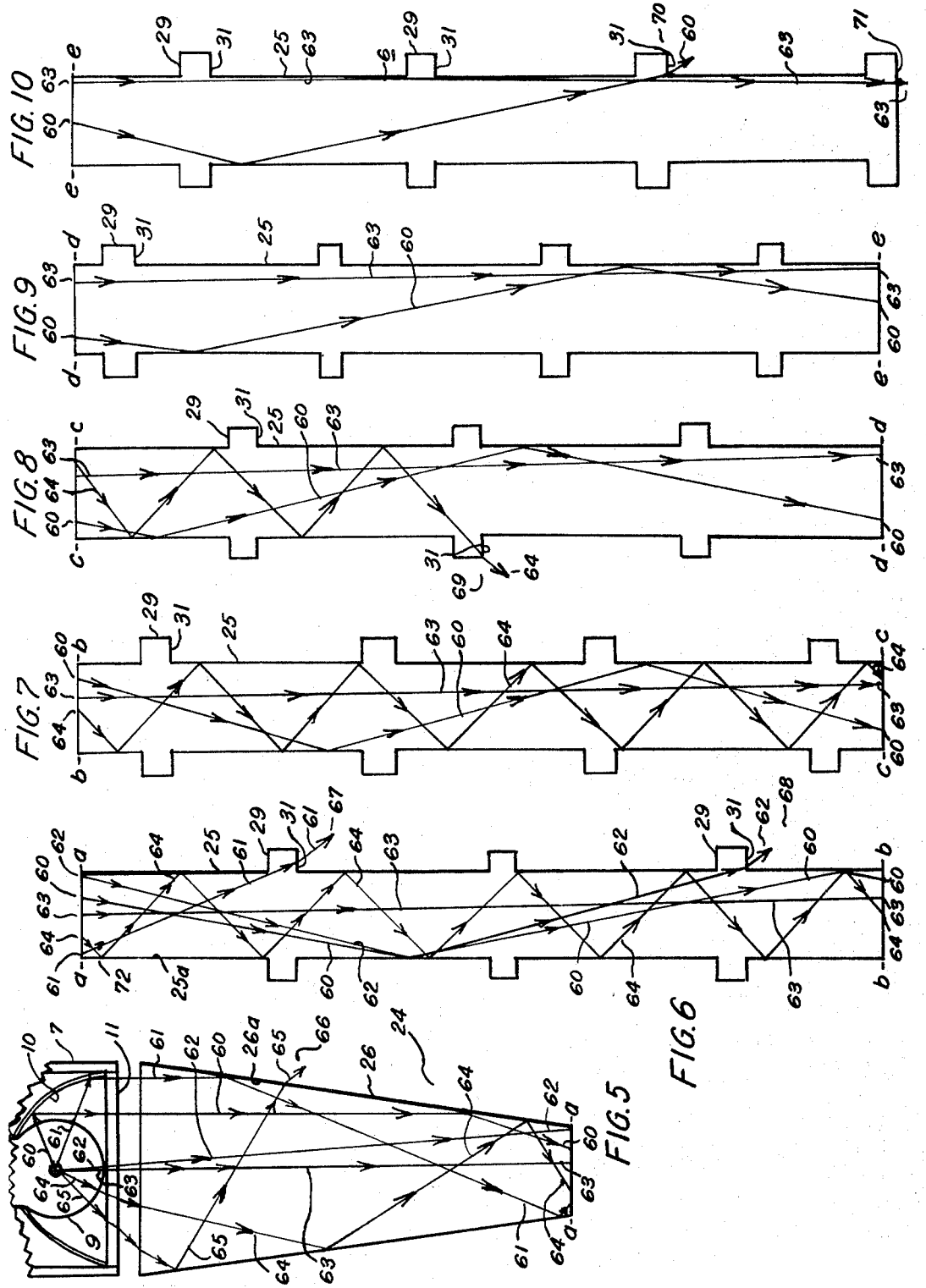

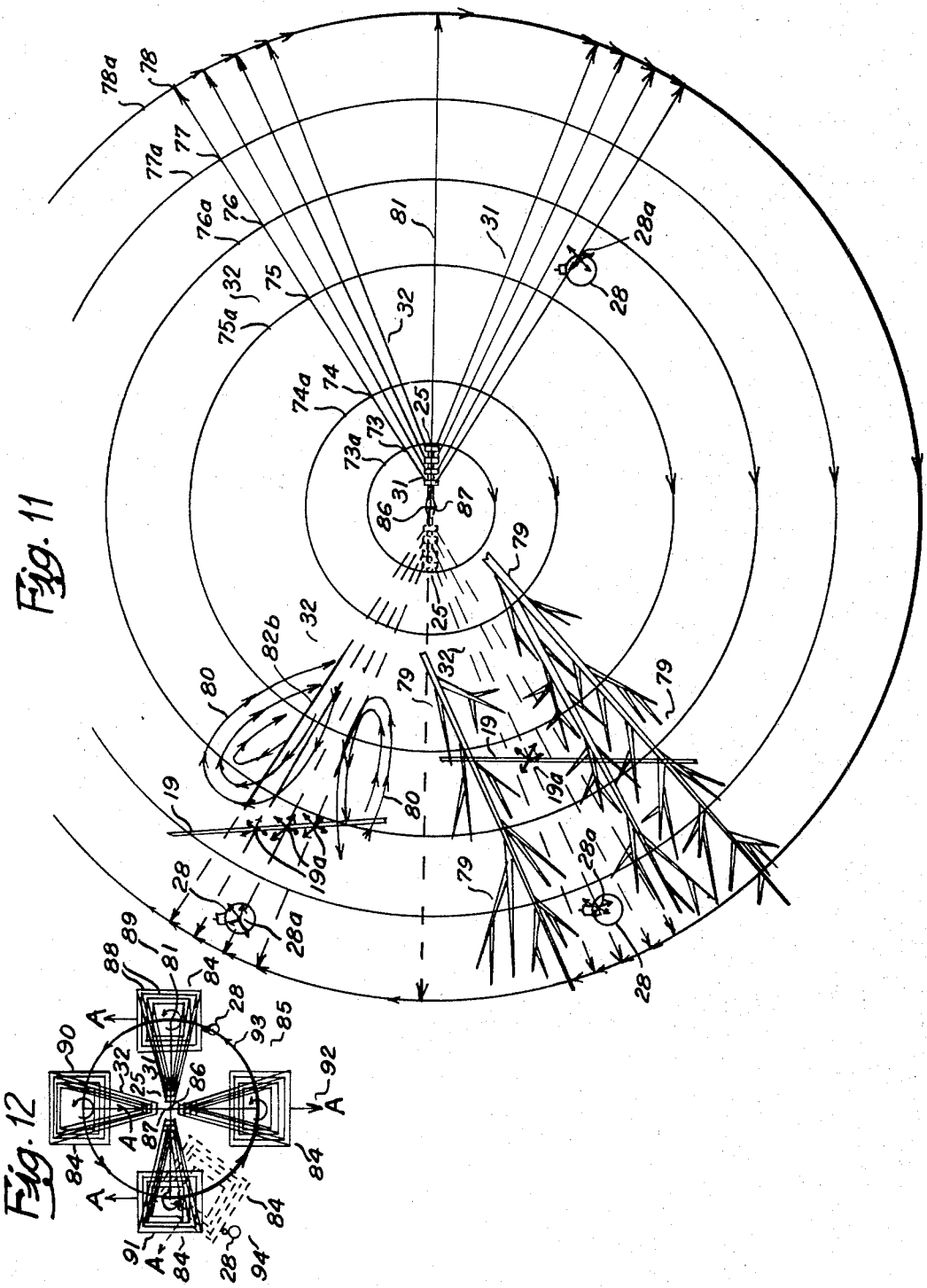

3,389,247
PENDULUM LIGHT SOURCE
Fay E. Null, Choctawmar Subdivision, Fla.
(Box 158, Shalimar, Fla. 32579)
Filed July 1, 1964, Ser. No. 379,596
10 Claims. (Cl. 240—10)

ABSTRACT OF THE DISCLOSURE

This invention concerns the transfer of intense light from a fixed source to a pendulum source with a single fiber-type suspension, so that in a slight breeze said pendulum will have coupled oscillations of swing and spin. The pendulum source acts as a light funnel by total reflection from the walls except at windows formed at surface angles to interior rays that permit outward refraction. The pendulum oscillations sweep the relatively intense beams from said windows across nearby ornaments with a scintillation pattern that never quite repeats. A light control rheostat also generates entrained air-steam jets for oscillation of said pendulum and to give colored cloud effects.

---

This invention relates to an improvement in decorative light sources in which a relatively fixed light source transfers much of its light output to a pendulum secondary source. The pendulum light source is attached to the fixed light source by a single fiber type suspension so that it can be given a combined swing and twist type of oscillation by a slight breeze. The resulting sweeping and spinning pattern of scintillation on nearby ornaments and background such as pine needles is similar to that produced by a flickering candle flame or beams of moonlight patterned by swaying pine boughs.

Former attempts to obtain moving pattern illumination by controlled beams of light on objects such as Christmas trees has not been effective, first, because the beams have been poorly defined, more like flood than spot illumination, and second, because the distance between the light beam source and the illuminated objects may be nearly the height of a Christmas tree. The intensity of illumination of a given object falls off approximately inversely as the square of the distance for the same beam diameter in degrees, and the pendulum lights have the great advantage that they are simple enough that strings of the lights can be scattered around a tree where the extended pendulum sources of light will be close enough to nearby objects for an intense scintillation.

The single fiber type of suspension has two modes of oscillation coupled together. One mode of oscillation is the swing of a compound pendulum and the other is the twist of a torsion pendulum about its axis. In the usual, non-uniform light breeze, the axis of the light source pendulum will describe a conical surface of revolution with a superimposed rotation about its axis that may differ in phase from the conical revolution by 0° to 360°. This causes ornaments such as icicle foil to be illuminated in succession by the light beams from the pendulum secondary light source, and with a rhythm that never quite repeats, since the actuating breeze is somewhat random in nature, particularly in flow through obstacles.

The desired, artistic window brightness pattern on the pendulum light source gives the corresponding light ray pattern for illumination of surrounding ornaments and decorations. If the pendulum light source is a hollow member with an opening at the top to receive the light from the primary source, then the interior surfaces are made highly reflecting so that the internal rays are reflected back and forth until they strike an opening in the wall which acts as a window. If the angles of incidence of the internal rays on the walls is appreciable, the number of reflections before striking a window may be large with corresponding large reflection losses. These internal reflection losses can be eliminated by using a solid, transparent, plastic pendulum light source. Many of the internal rays will make small angles to a vertical wall, and a corresponding large angle of incidence to the perpendicular to said wall, and for many rays said angles of incidence will be larger than the critical angle of the plastic material, and total reflection will occur without loss. Transmission loss through the plastic is relatively small. At desired window positions the slopes of the walls are such that the angles of incidence of the internal rays is less than the critical angle of the plastic, and said rays are refracted out in external beams similar to the rays from a lighthouse.

For indoor usage the desired amplitude of pendulum light source oscillation may require a special breeze source, preferably not from a fan which might produce enough noise to interfere with Christmas music. A rheostat is used for a combination source brightness controller and steam generator which directs jets of steam cooled by entrained air for the breeze to make the pendulum light sources sway and spin.

The turbulent steam-air jets have a distinct decorative effect; the water droplets in these jets scatter enough light to make the beams from the pendulum light source visible, with effects similar to the suns rays breaking through clouds.

It is therefore among the objects of the present invention to provide a secondary pendulum light source that will sway and swirl in a light breeze and give to surrounding decorations a rhythmic scintillation pattern that never quite repeats.

Another object of the present invention is to obtain the desired artistic brightness pattern on the pendulum light source by designing the pendulum wall slope at desired windows to obtain internal angles of incidence less than the critical angle for the pendulum material.

Another object of the present invention is to provide a rheostat that controls the light source brightness and generates steam for steam-air jets which produce the desired breeze for oscillation of the pendulum light sources.

Another object of the present invention is to produce turbulent steam clouds that will make visible the paths of the external light beams with the effect of moonlight breaking through billowing clouds.

Another object of the present invention is to provide extended sources of moving light patterns that are simple, inexpensive, and with no mechanically mated parts, so that strings of said extended pendulum sources can for example, be arranged around a Christmas tree close enough to ornaments to give a bright, changing scintillation.

Objects and advantages other than those set forth will be apparent to those skilled in the art from the following description when used in connection with the accompanying drawings in which;

FIG. 1 is a schematic of, a fixed, primary light source with its cylindrical case, filter, and mirror shown in vertical section to give an elevation view of the lamp and socket, and a vertical section of the attached pendulum light source with the emergent light beams that are in the plane of the section. A schematic representation is given of the light beams reflected from the ornaments which for illustrative purposes are not shown in section. FIG. 2 is a bottom view of the square outlines of the pendulum light source, with the broken lines indicating the circular outline of the fixed light source. FIG. 1 also shows the electrical connections for four strings of lights in series, with the ten in a string in parallel. The numeral 4 indicates the lamp-bank used as rheostat and steam generator with part of the case broken away, while FIG. 3 shows the top view of the lid with switch, fuze, and leads to the lampbank on the under side. FIG. 4 shows a top view of the interior panel which supports the lamp sockets and carries the bus wire lay-out for clipping on individual lamps to obtain the required resistance.

FIGS. 5 through 10 give a ray diagram enabling one to estimate the relative brightness as the windows of the pendulum light source are positioned down from the top. It shows a section of the pendulum light source and part of the fixed light source also shown in section, with a scale large enough to trace out individual rays in the plane of the section. Cross-hatching is omitted for clearness. The drawing of the long, pendulum light source has been broken up into six separate lengths, shown in FIGS. 6 through 10, the top of a given length corresponding with the bottom of the preceding length.

FIG. 11 is a top view of the conical surface generated by the center line of the pendulum light source when said pendulum centerline is revolved through 360° about a vertical through the point of suspension while inclined at a given angle to said vertical. The rays shown as solid lines approximately follow said conical surface swept out by the pendulum centerline. For straight line widths of the pendulum section do not have ends substantially raised above said conical surface. The broken lines show a position of the rays and pendulum 180° from the solid line position. As the pendulum swings in its conical path successive light rays are shown that will pass over ornaments on the conical surface with a series of scintillations. The effect of light beams filtering through pine needles and steam-air jet clouds is also indicated.

FIG. 12 is a top view of the light patterns traced on the floor by a revolving and rotating pendulum light source, and shows what succession of scintillations could be expected from ornaments placed at different radial and phase positions with respect to the revolution and rotation of said pendulum light source. For clearness only the light rays from said pendulum light source to the exterior sides of said light patterns are shown. To illustrate the phase change of two light patterns close together, one pattern is shown with dashed lines. The approximately square light patterns strike the floor at a small angle to the vertical so that their projections on the floor are drawn as squares for ease of illustration.

Referring more particularly to the drawings by character of reference, reference numeral 1, FIG. 1, indicates the fixed, primary light source, with cylindrical case 7 supporting the socket 8, lampbulb 9, mirror 10, and color filter 11. Socket connectors 12 lead to the insulated wire pair 13, which for a large scale has been extended to source 1 from string 14 of light sources in parallel. Holes 15 in the mirror and 16 in the case permit unfiltered rays of light 17 to spot illuminate cylindrical ornament 18 and icicle ornament 19 with scintillation points 18a and 19a while upper holes 20 permit circulation of air through said case 7. The square sided, transparent pendulum 24 is supported from color filter 11 by single fiber filament 22. Rays of colored light 23 are directed downward from filter 11 into the top of pendulum 24. The pendulum 24 has a square sided light funnel upper portion 26 that receives light from the circular filter in case 7, and directs most of it down into the square sided prism 25. See the bottom view FIG. 2 with line 1—1 indicating the section of the light source pendulum shown in FIG. 1. Not all of the rays 23 directed into the top of light funnel 26 are reflected on down into prism 25; when the angle of incidence on the wall 26a of 26 is less than the critical angle of the material of pendulum 24, those rays will be refracted out as at 27 with illumination of round ornament 28, and icicle foil ornament 19. The fraction of the rays 23 that is reflected down into small prism 25 at such an angle as to have internal total reflection from its walls, continues to have the same angle of incidence to said parallel walls (neglecting the deck windows 29) and since his angle of incidence is greater than the critical angle, total reflection will occur without loss until the light leaves the bottom of prism 25 at 30. However, the larger cross-sections of decks 29 have lower surfaces 31 for which the angle of incidence is less than the critical angle, so that light rays striking said surface 31 are refracted outward as beams 32 that scintillate as at 19a from icicle ornament 19 and at 28a from spherical ornament 28. The beams 32 are refraced out from the lower surfaces 31 of decks 29 in hollow square patterns, but only the beams 32 in the given sectional plane of the pendulum light source 1 are indicated.

The wiring diagram for 4 strings of pendulum lights 1 is shown in FIG. 1. Each string 14 has 10 pendulum lights in parallel, and there are 4 strings 14 in series with leads 33 to variable rheostat and steam generator 4. Leads 33 are in series with lampbank 34 in which individual lamps 35 are supported from insulated panel 36 by sockets 37, and are partially immersed in water 38 with rubber collars 39 to prevent shorting. The duct 40 leads from the steam space 41 to rubber tube exhausts 42, to produce steam-plus-entrained-air jets 43 to provide the gentle breeze required for oscillation of said pendulum light sources 24. Straight lines 44 indicate the general outline of the jet and curved lines 45 show the turbulent flow. The air in the steam-air jet 43 has lowered the temperature of the jet so that it is not injurious to the needles of a tree. The rays 32 are in general invisible until they impact on an ornament or tree and are drawn dotted as at 32a. Where said beams 32 pass through the steam-air jets they become visible by scattered light in a similar manner to a searchlight beam, and these parts 32b of beams are indicated by solid lines.

The lid 5 of the combination rheostat and steam generator 4, is shown in FIG. 3 as a top side view. The input leads 46 pass below the surface of said lid at 47, are in series with switch 48 (with only insulated handle 49 on the outside of lid 5), and fuze 50, which is in series with flexible, coiled leads 51 and pass out through lid 5 at 51a as leads 33. A top view of panel 36 is shown in FIG. 4. Flexible leads 51, a continuation of the leads 51 on the lid 5 are in series with bus bars 52 which are patterned for lampbank 53 (lampbulbs 35 connected in parallel in the bank), in series with lampbank 54 (lampbulbs 35 in parallel in the bank), and for lampbank 55 in shunt (with lampbulbs 35 in parallel in the bank). Individual lampbulbs 35 have flexible leads 56 and clips 57 for attachment to terminals 58 and 59 on bus bars 52 as desired for a given resistance and brightness of light sources 1.

FIGS. 6 through 10 form a ray tracing diagram showing an enlarged, extended view of the section of light pendulum 24 indicated in FIG. 1, except that for the convenience of a large scale in ray tracing, the top portion has been broken away and the length of the pendulum 24 has been split up into six sections in the FIGS. 6 through 10. Cross hatching is not used on cross-section of the pendulum light source 24 as it would obscure the traced rays. As in FIG. 1 the case 7 supports the bulb 9, the mirror 10, and the filter 11. For clearness the fiber support 22 and its well 22a of FIG. 1 (to permit a longer, more easily twisted fiber) have been omitted; since the amount of light entering well 22a is a rather small fraction of the total amount reflected into light funnel 26. Approximate patterns are illustrated for rays 60, 61, 62, 63, 64, and 65.

The nearly vertical ray 63 is only reflected once, and from the wall of the lowest section of prism 25 at 6. It only has one chance to be refracted through a window 31 in a deck 29; the positions of decks 29 are such that ray 63 misses the window near 6 and passes out of the bottom end of pendulum prism 25 at 71. Ray 60 reflected from mirror 10 is also nearly vertical, but it has one reflection from light funnel 26 and has 9 reflections from the walls of prism 25 before it hits a window 31 at 70 and is refracted out. The ray 64 make an appreciable angle to the wall 26a of light funnel 26 and the angle of incidence is decreased by a second reflection from a wall 26a, but it still is incident on a wall 25a of pendulum prism 25 at 72 at greater than a critical angle of 38.3° for an index of refraction of about 1.6, and is totally reflected from walls 25a, 24 times without reflection loss until it hits the window 31 at 69. The fact that ray 64 was very close to several windows 31 before it was finally refracted out, shows that rays with a slightly smaller initial angle of incidence (more nearly perpendicular to the walls) would have been refracted out much sooner. Thus the brightness pattern of rays 32 of FIG. 1 is markedly dependent upon both the initial angle of incidence of the light ray upon the surface of wall 26a and upon the design position of windows 31. Ray 65 with a relatively small angle of incidence to the perpendicular to wall 26a of light funnel 26, has an angle of incidence less than the critical angle at the second incidence on wall 26a and is refracted out at 66. Ray 61 is nearly vertical, strikes the wall 26a of light funnel 26 at such a position that it is reflected twice from wall 26a, and strikes the first available window at 67. Ray 62 has its first reflection from wall 25a of pendulum prism 25, and is reflected once more before it is refracted out of window 31 at 68. Thus rays initially nearly vertical and entering the central part of light funnel 26 tend to be refracted out near the bottom end of prism 25. As the area of the top of light funnel 26 receiving the above type of rays is less than the surrounding peripheral area, the light rays escaping from windows 31 near the bottom of prism 25 have less intensity than those from windows 31 near the top. This would normally add interest to the brightness pattern of the light source pendulums 24, but if desired the effect could be reduced by having a light funnel 26 with walls 26a of lesser slope (which would require a larger prism 25) and by making the windows 31 of decks 29 smaller at the top of prism 25. Design variations of the brightness and configuration pattern of the windows of pendulum 24, can thus be made by variation in geometric parameters and in the critical angle of the material of the prism.

FIG. 11 indicates the top view of the conical surface swept out by the centerline and end ray 81 of the pendulum prism 25 of light source pendulum 24 when it revolves 360° about the vertical axis 86 through its point of suspension 87 while inclined at a nearly constant angle to the vertical. A cross-section through the centerline 81 of said prism 25 lies approximately in said conical surface and the rays of light 32 emitted from windows 31 in said cross-section are shown as in the conical surface swept out by centerline 81. For simplicity only 4 windows are shown. Neglecting for the present rotation of prism 25 about centerline 81, points such as 73, 74, 75, 76, 77, and 78 on rays 32 sweep out circles 73a, 74a, 75a, 76a, 77a, and 78a on the conical surface of FIG. 11, and any ornament such as 28 lying on said conical surface and in the path of such rays 32 as indicated by the solid lines will scintillate in rapid succession as at 28a as the 8 rays 32 and the end ray 81 pass over it in the revolution of pendulum prism 25. The dotted lines show prism 25 and rays 32 at a position of revolution of 180 additional degrees. The scintillations 28a and 19a of ornaments 28 and 19 by rays 32 breaking out through rifts in the tree boughs 79 is symbolic of sunlight or moonlight filtering down through the boughs of a forest tree. The scintillations 28a and 19a of the ornaments 28 and 19 by rays 32 breaking out through rifts in the turbulent steam-air clouds 80 from steam-air jets 43, FIG. 1, is symbolic of the fan-like rays from the sun or moon reflected from cloud to cloud. The rays 32 whose paths 32b are made visible by reflection from steam-air clouds 80, are drawn as solid lines. Superimposed upon the above conical revolution is a rotation of pendulum prism 25 about its centerline and end ray 81, as illustrated in FIG. 12.

FIG. 12 shows the light pattern 84 produced on the floor 85 by prism 25 rotating about its own axis 81 at twice the frequency of revolution about the vertical 86 through its point of suspension 87. Each window 31 projects its hollow, pyramidal, roughly square light pattern 88 on floor 85.

The intensity of the light at the corners of the roughly square light patterns 88 formed by windows 31 is less than along the middle of the sides, since in FIG. 1 the light intensity at the corners of pendulum 24 is less than at the centers of the sides, since the rays 23 are spread over a larger area at the greater distance to the corners. The rotation of said roughly square light patterns 88 may be observed by the change in illumination of objects, as sides and corners of patterns 88 and 84 pass over them. The light pattern 88 actually has tufts at the corners but for pictorial purposes is shown as square. The square pattern strikes the floor at a small angle to the vertical so that its rectangular projection on the floor does not depart enough from a square to noticeably change the appearance of the pattern. For clearness only those rays 32 from windows 31 to patterns 88 are drawn that extend to the exterior corners of light patterns 88. The rays of light from light funnel 26, FIG. 1, act in a similar manner and are not shown.

At position 89 the identifying phase vector A for the light pattern 84 has the direction indicated; at 90 for ¼ revolution A has rotated ½ cycle; at 91 A has completed one cycle of rotation, at 92, 1½ cycles, and at 89 has returned to its original phase. An ornament 28 on the circular path 93 of the center of illumination pattern 84 would in one revolution of prism 25 be passed over by twice as many sheets of light as there are windows 31, and by end beam 81. While an ornament 28 positioned at 94 would be passed over by the corner of light pattern 84, drawn in dotted lines to distinguish from light pattern 84 at 91. This gives fewer scintillations of lower intensity.

The light pattern 84 emitted by the pendulum prism 25 increases in size as it travels toward the floor 85, and is partially intercepted by ornaments 28 and 19, FIG. 11, boughs of trees 79, and by steam-air cloud 80 which also makes rays 32 visible by scattering of light with a searchlight effect. The combined, revolution of pendulum prism 25 about a vertical 86 through its point of suspension 87, and a superimposed rotation about its centerline 81 cause illumination patterns 84 to sweep and swirl across ornaments 28 and 19, boughs 79 and clouds 80, causing a rhythm of scintillation that never quite repeats, since the steam-air jet 43, FIG. 1, that makes pendulum prism 25 oscillate is turbulent, and the fascination of turbulent flow with eddies and whirlpool effects, is that it is non-predictable.

It is claimed and desired to secure by Letters Patent:

1. A decorative light source comprising, in combination: a primary light source directing a beam of light substantially in the downward, vertical direction; a single fiber-type suspension from said primary light source to coact with a pendulum secondary light source for the elimination of the friction of rubbing support surfaces, and for positioning said secondary pendulum light source to receive said beam of light at its upper end so that it may act as a light duct for illumination of objects removed from said primary light source; said secondary light source consisting of, a pendulum, and windows in said pendulum, such that beams of light from said windows are set in motion in the swing and twist modes of oscillation of said pendulum when activated by a faint breeze, to produce an illumination pattern of ceaseless change.

2. A decorative light source comprising, in combination; a primary light source; a single fiber-type suspension from said primary light source to a solid, transparent, plastic pendulum which is thereby positioned to receive substantially the entire light output from said primary light source into its upper end; said solid, transparent, plastic pendulum consisting of, a light duct formed by the walls of said solid, transparent, plastic pendulum, angles to the walls of said solid, transparent, plastic pendulum, to most of the interior light rays such that said rays are totally reflected downward without loss, window surfaces on the walls of said solid, transparent, plastic pendulum with such angles of incidence to many of the interior rays that a substantial fraction of said interior rays are refracted out of said window surfaces in a downward direction, such that the illumination pattern formed by the outward refracted rays revolves and rotates when said pendulum is set in motion by a slight breeze.

3. A decorative light source comprising, in combination; a primary light source; a single fiber-type suspension from said primary light source to a secondary light source pendulum that is thereby positioned to receive at its upper end the light from said primary light source; said secondary light source pendulum consisting of; a light duct formed by the walls of said secondary light source pendulum to carry the intense light from said primary light source down the length of said light source pendulum and available for the illumination of ornaments removed from said primary light source; and windows in the walls of said secondary light source pendulum that form bright beams of light that fall on said ornaments, such that said ornaments scintillate in said bright beams, and are illuminated by oscillating scintillation patterns formed when said secondary light source pendulum is set in motion by a faint breeze.

4. A decorative light source comprising, in combination; a primary light source consisting of, a case, openings in said case for ventilation, a lamp socket mounted in said case, insulated electrical connections through said case to said socket, a lampbulb mounted in said socket, a parabolic reflector positioned by mounting means inside said case with its focus approximately at the filament of said lampbulb, openings for ventilation in said parabolic reflector aligned with said openings in said case for stationary light beam formation and illumination of neighboring ornaments, and an exchangeable color filter window in the bottom of said case, so that the selected color of an approximately parallel light beam emerges substantially perpendicular to the bottom of said filter window; a single fiber-type suspension from said primary light source to a solid, transparent, plastic pendulum thereby positioned with the upper end under said primary light source to receive the approximately parallel beam transmitted through said filter; said solid, transparent, plastic pendulum consisting of, a light duct formed by the walls of said pendulum with angles to interior rays for total reflection without loss and windows with surfaces at angles to a substantial portion of said interior rays for their outward refraction, such that the illumination patterns formed by said refracted rays will revolve and rotate when said plastic pendulum is set in motion by a faint breeze.

5. A decorative light source comprising, in combination; a primary light source consisting of, a case, openings in said case for ventilation, a lamp socket mounted in said case, insulated electrical connections through said case to said socket, a lampbulb mounted in said socket, a parabolic reflector mounted with its focus approximately at the filament of said lampbulb by mounting means inside said case, openings for ventilation in said parabolic reflector, and an exchangeable color filter window in the bottom of said case, so that the selected color of an approximately parallel light beam emerges perpendicular to the bottom of said filter window; a single fiber-type suspension from said primary light source to a solid, transparent, plastic pendulum positioned thereby with its upper end under said primary light source, to receive the approximately parallel beam transmitted by said exchangeable, color filter window; said solid, transparent, plastic pendulum consisting of a light duct formed by the walls of said solid, transparent, plastic pendulum with angles to incident interior rays for total reflection downward without loss, and windows with surfaces at angles to a substantial portion of said incident, interior rays for their outward refraction, such that the illumination patterns formed by the outward refracted rays from said windows revolve and rotate when said plastic pendulum is set in oscillation by a faint breeze.

6. A decorative light source comprising, in combination; a primary light source; a single fiber-type suspension from said primary light source to a pendulum light source which is positioned thereby to receive the light from said primary light source into its upper end; said pendulum light source consisting of, a light duct formed by wall surfaces that reflect interior rays down its length, and windows in said wall surfaces such that light beams emitted from said window form an illumination pattern that revolves and rotates when said pendulum light source is set in motion by a faint breeze; a steam generator; a flexible exhaust tube from said generator positioned by support means to blow a steam jet mixed with cooling air upon said pendulum light source, and such that steam clouds formed around said pendulum light source make said light beams visible by scattered light.

7. A decorative light source comprising, in combination; a primary light source; a single fiber suspension from said primary light source to a solid, transparent, plastic pendulum which is positioned thereby to receive the light from said primary light source into its upper end; said solid, transparent, plastic pendulum consisting of, walls at such slopes to many interior rays that total reflection occurs without loss, and windows on said plastic pendulum formed by surfaces at such angles to many interior rays as to refract them out of said solid, transparent, plastic pendulum, such that the light beams from said windows form illumination patterns that revolve and rotate when said solid, transparent, plastic pendulum is set in motion by a faint breeze; and a steam generator; a flexible tube from said steam generator positioned by support means to blow a steam jet mixed with cooling air to impact against and set in motion said solid, transparent, plastic pendulum, and such that steam clouds formed by said steam jet make said light beams visible by scattered light.

8. A decorative light source comprising, in combination; a primary light source; a single fiber-type suspension from said primary light source to a secondary light source which is thereby positioned to receive the light from said primary light source into its upper end; said pendulum secondary light source consisting of, walls that duct the light from said primary light source in the downward direction of its vertical axis, and windows that permit the escape of light from said secondary light source, such that light beams emitted from said windows form an illumination pattern that revolves and rotates when said pendulum, secondary light source is set in motion by a faint breeze; a combination rheostat and steam generator consisting of, a variable resistance lampbank, and lampbulbs partially immersed in water for the generation of steam; and strings composed of individual units of said decorative light source in series with said variable resistance lampbank for their brightness control; a jet exhaust duct from said combination rheostat and steam generator, such that a steam jet from said jet exhaust duct is mixed with cooling air to provide a faint breeze to set said individual units of said decorative light source in oscillation, and such that clouds of steam from said steam jet make said light beams visible by scattered light.

9. A decorative light source comprising, in combination; a primary light source; a single fiber-type suspension from said primary light source to a solid, transparent, plastic pendulum positioned thereby to receive the light rays from said primary light source into its upper end; said solid, transparent, plastic pendulum consisting of, walls at angles to most interior rays for their total reflection without loss, and windows at angles to a substantial portion of the interior rays for their refraction out of said windows; such that light beams from said windows form illumination patterns that revolve and rotate when said solid, transparent, plastic pendulum is set in motion by a faint breeze; a combination rheostat and steam generator; consisting of a variable resistance lampbank and lampbulbs partially immersed in water for the generation of steam; strings composed of individual units of said decorative light source connected in series with said variable resistance lampbank for their brightness control; a steam jet exhaust from said steam generator and rheostat, such that an entrained air-steam jet formed from said steam jet exhaust provides a faint breeze to oscillate said plastic pendulum, and such that clouds of steam formed by said entrained air-steam jet, makes the path of said light beams visible by scattered light.

10. A decorative light source comprising, in combination; a primary light source; a single fiber-type suspension from said primary light source to a solid, transparent, plastic pendulum which is positioned thereby to receive the light from said primary light source into its upper end; said solid, transparent, plastic pendulum consisting of, a light funnel in its upper end, formed by walls sloping inward at angles of incidence for interior rays that are partly greater and partly less than the critical angle for the plastic material so that some of said interior rays are refracted out of said light funnel with illumination of nearby objects, and some are totally reflected downward without loss, a parallel walled, smaller cross-section portion of said solid, transparent, plastic pendulum below said light funnel, so that if total reflection occurs for the rays from said light funnel, all subsequent incidence of said rays on the parallel walls will give total reflection without loss, windows with angles of incidence for most of the interior rays of less than the critical angle for the plastic material such that said rays are refracted out of said windows, such that beams of light from said windows revolve and rotate when said plastic pendulum is set in motion by a faint breeze, and such that ornaments illuminated by said beams of light will form a changing scintillation pattern.

References Cited

UNITED STATES PATENTS

| | | | |
|---|---|---|---|
| 2,042,905 | 6/1936 | McCluskey | 240—10 X |
| 2,513,565 | 7/1950 | Johnson | 240—10 |
| 2,719,214 | 9/1955 | Potter | 240—10 X |

FOREIGN PATENTS

| | | |
|---|---|---|
| 77,842 | 3/1962 | France. |

NORTON ANSHER, *Primary Examiner.*

JOSEPH F. PETERS, *Assistant Examiner.*